(12) United States Patent
Park et al.

(10) Patent No.: US 7,474,675 B2
(45) Date of Patent: Jan. 6, 2009

(54) IP PACKET VERSION CONVERTING APPARATUS AND METHOD

(75) Inventors: Soo-hong Park, Yongin-si (KR); Young-keun Kim, Incheon (KR); Sun-woo Kim, Suwon-si (KR); Pyung-soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 726 days.

(21) Appl. No.: 10/936,666

(22) Filed: Sep. 9, 2004

(65) Prior Publication Data

US 2005/0068981 A1 Mar. 31, 2005

(30) Foreign Application Priority Data

Sep. 25, 2003 (KR) .................... 10-2003-0066497

(51) Int. Cl.
*H04J 3/16* (2006.01)
*H04J 3/22* (2006.01)

(52) U.S. Cl. .............. 370/469; 370/401; 370/465; 370/466; 370/467; 370/471; 370/230; 370/231; 370/395.52; 709/230; 709/240; 709/245

(58) Field of Classification Search ............... None
See application file for complete search history.

(56) References Cited

U.S. PATENT DOCUMENTS 6,038,233 A * 3/2000 Hamamoto et al. ......... 370/401
6,094,525 A * 7/2000 Perlman et al. ............ 709/245
2003/0185236 A1* 10/2003 Asano et al. ............... 370/469

* cited by examiner

*Primary Examiner*—Chi H Pham
*Assistant Examiner*—Raj K Jain
(74) *Attorney, Agent, or Firm*—Staas & Halsey LLP

(57) ABSTRACT

An IP packet version converting apparatus and method, the IP packet header converting method includes recognizing one of fields of a header of an IP packet of a first type, in which a value regarding an expansion function is recorded, the expansion function being incompatible between the IP packet of the first type and an IP packet of a second type; and converting the field recognized in one of the fields of the header of the IP packet into a field compatible with the IP packet of the second type.

16 Claims, 8 Drawing Sheets

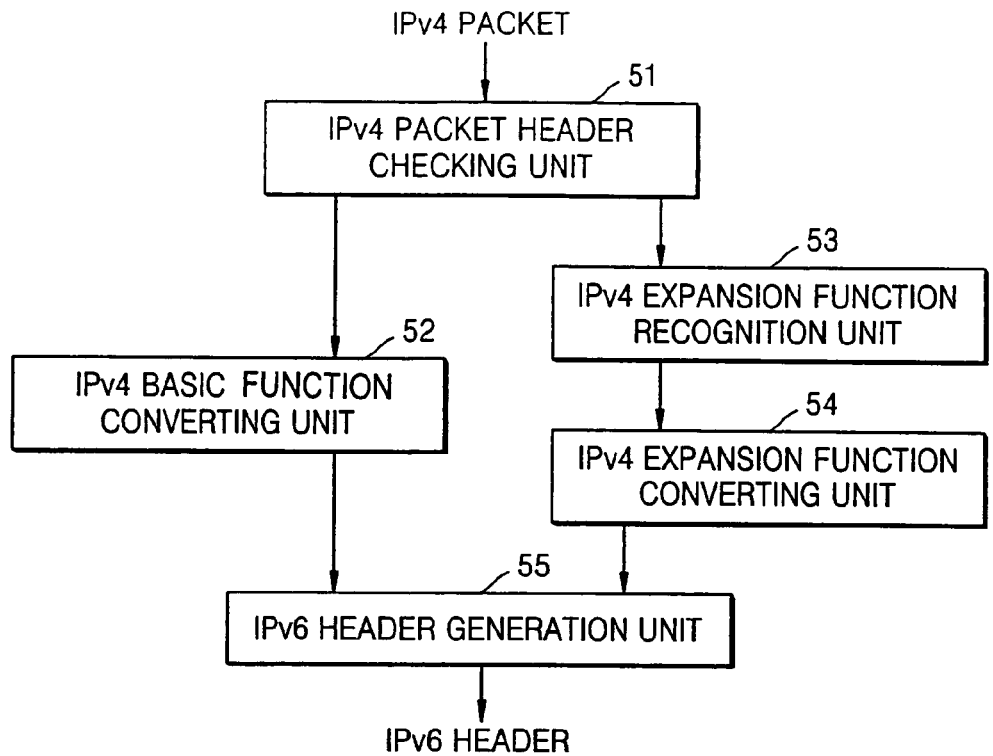
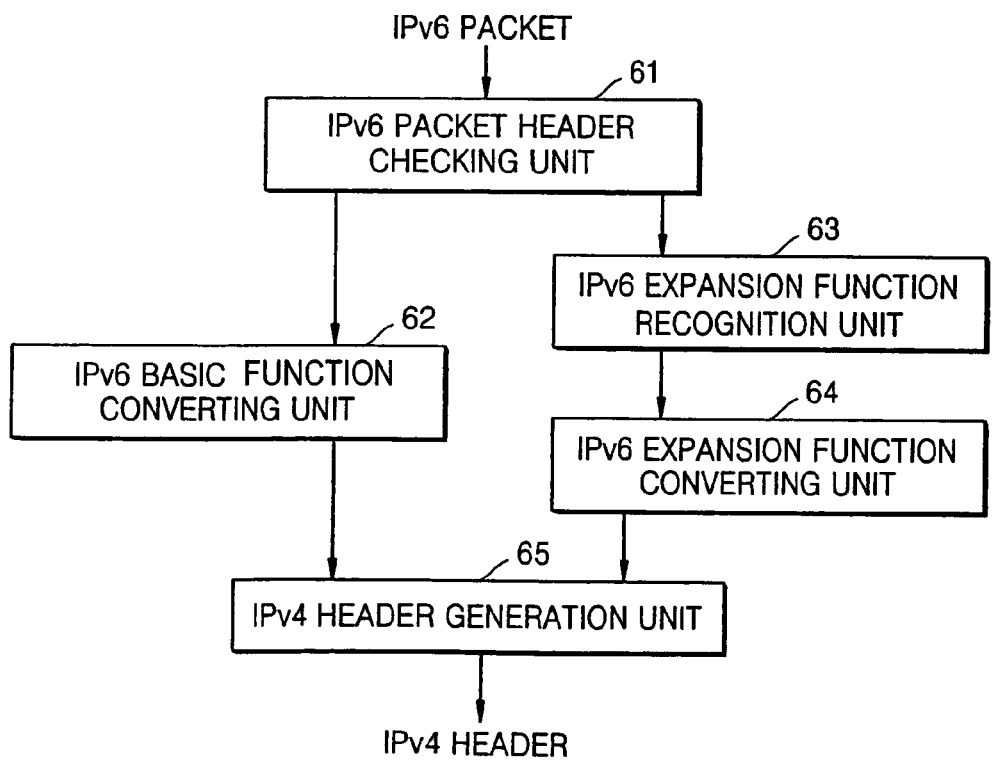

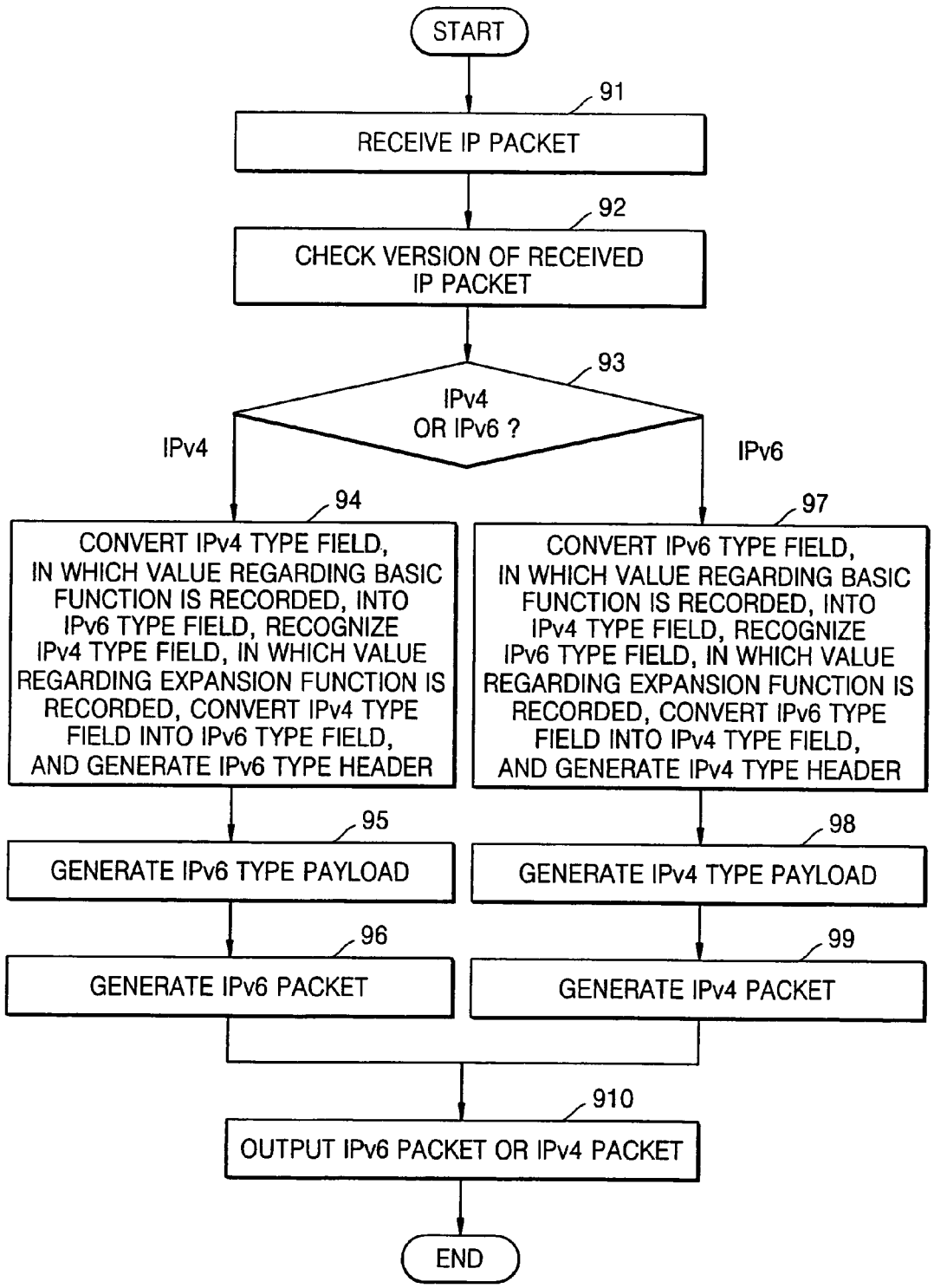

IP PACKET VERSION CONVERTING APPARATUS AND METHOD

CROSS-REFERENCE TO RELATED APPLICATION

This application claims the benefit of Korean Patent Application No. 2003-66497, filed on Sep. 25, 2003, in the Korean Intellectual Property Office, the disclosure of which is incorporated herein by reference.

BACKGROUND OF THE INVENTION

1. Field of the Invention

The present invention relates to an Internet protocol (IP), and more particularly, to an IP packet version converting apparatus and method.

2. Description of the Related Art

An IPv4 packet can be converted into an IPv6 packet and vice versa by using a stateless IP/ICMP translator, which is defined in Request for Comments (RFC) 2765. For example, in the process of converting an IPv4 packet into an IPv6 packet or vice versa, only functions specified in both a header of the IPv4 packet and a header of the IPv6 packet are compatible between the IPv4 packet and the IPv6 packet, while functions specified only in one of the header of the IPv4 packet and the header of the IPv6 packet are not compatible and are thus ignored.

A fragment function of the IPv4 packet can be successfully handed over to the IPv6 packet and a fragment function of the IPv6 packet can be handed over to the IPv4 packet using an expansion header of the IPv6 packet. In short, functions defined in the RFC 2765 are normally transferred between the IPv4 packet and the IPv6 packet. However, functions not specified in the RFC 2765 are ignored in the process of converting the IPv4 packet into the IPv6 packet or vice versa, which results in problems in the converting process. More specifically, there is a great possibility of undesirably losing values recorded in a specific field of the header of the IPv4 packet, a specific field of the header of the IPv6 packet, or the expansion header of the IPv6 packet in the process of converting the IPv4 packet into the IPv6 packet or vice versa. Thus, if those values are accidentally lost, corresponding functions may not be transferred between the IPv4 packet and the IPv6 packet.

For example, an IPv4 security function defined in RFC 3514 is specified in a fragment offset field of the header of the IPv4 packet. Since the IPv4 security function is likely to be ignored in the process of converting the IPv4 packet into an IPv6 packet, it may not be transferred to the IPv6 packet. Accordingly, the IPv6 packet without the IPv4 security function is likely to be vulnerable to hacking attacks.

SUMMARY OF THE INVENTION

The present invention provides an IP packet version converting apparatus and method that convert an IPv4 packet into an IPv6 packet and vice versa. According to the present invention, functions of different versions of IP packets, i.e., an IPv4 packet and an IPv6 packet, which are not specified in RFC 2765, as well as functions of the IPv4 and IPv6 packets, which are specified in RFC 2765, are completely compatible between the IPv4 and IPv6 packets when the IPv4 packet is converted into the IPv6 packet or vice versa.

According to an aspect of the present invention, there is provided an IP packet header converting method. The IP packet header converting method involves recognizing one of a plurality of fields of a header of an IP packet of a first type, in which a value regarding an expansion function is recorded, the expansion function being incompatible between the IP packet of the first type and an IP packet of a second type; and converting the field recognized in the header of the IP packet of the first type into a field compatible with the IP packet of the second type.

According to another aspect of the present invention, there is provided an IP packet version converting method. The IP packet version converting method involves converting one of a plurality of fields of a header of an IP packet of a first type, in which a value regarding an expansion function is recorded, into a field of a header of an IP packet of a second type, the expansion function being incompatible between the IP packet of the first type and the IP packet of the second type; and generating a payload of an IP packet of the second type including data written in a payload of the IP packet of the first type.

According to another aspect of the present invention, there is provided a computer-readable recording medium, on which a program enabling the IP packet header converting method is recorded. Here, the IP packet header converting method involves recognizing one of a plurality of fields of a header of an IP packet of a first type, in which a value regarding an expansion function is recorded, the expansion function being incompatible between the IP packet of the first type and an IP packet of a second type; and converting the field recognized in the header of the IP packet of the first type into a field compatible with the IP packet of the second type.

According to another aspect of the present invention, there is provided a computer-readable recording medium, on which a program enabling an IP packet version converting method is recorded. Here, the IP packet version converting method involves converting one of a plurality of fields of a header of an IP packet of a first type, in which a value regarding an expansion function is recorded, into a field of a header of an IP packet of a second type, the expansion function being incompatible between the IP packets of the first and second types; and generating a payload of an IP packet of the second type including data written in a payload of the IP packet of the first type.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a block diagram illustrating an IPv4/IPv6 packet header converting apparatus, according to an embodiment of the present invention;

FIG. 6 is a block diagram illustrating an IPv4/IPv6 packet header converting apparatus, according to another embodiment of the present invention;

FIG. 9 is a flowchart of an IP packet version converting method, according to an embodiment of the present invention.

DETAILED DESCRIPTION OF THE EMBODIMENTS

Figure 1:
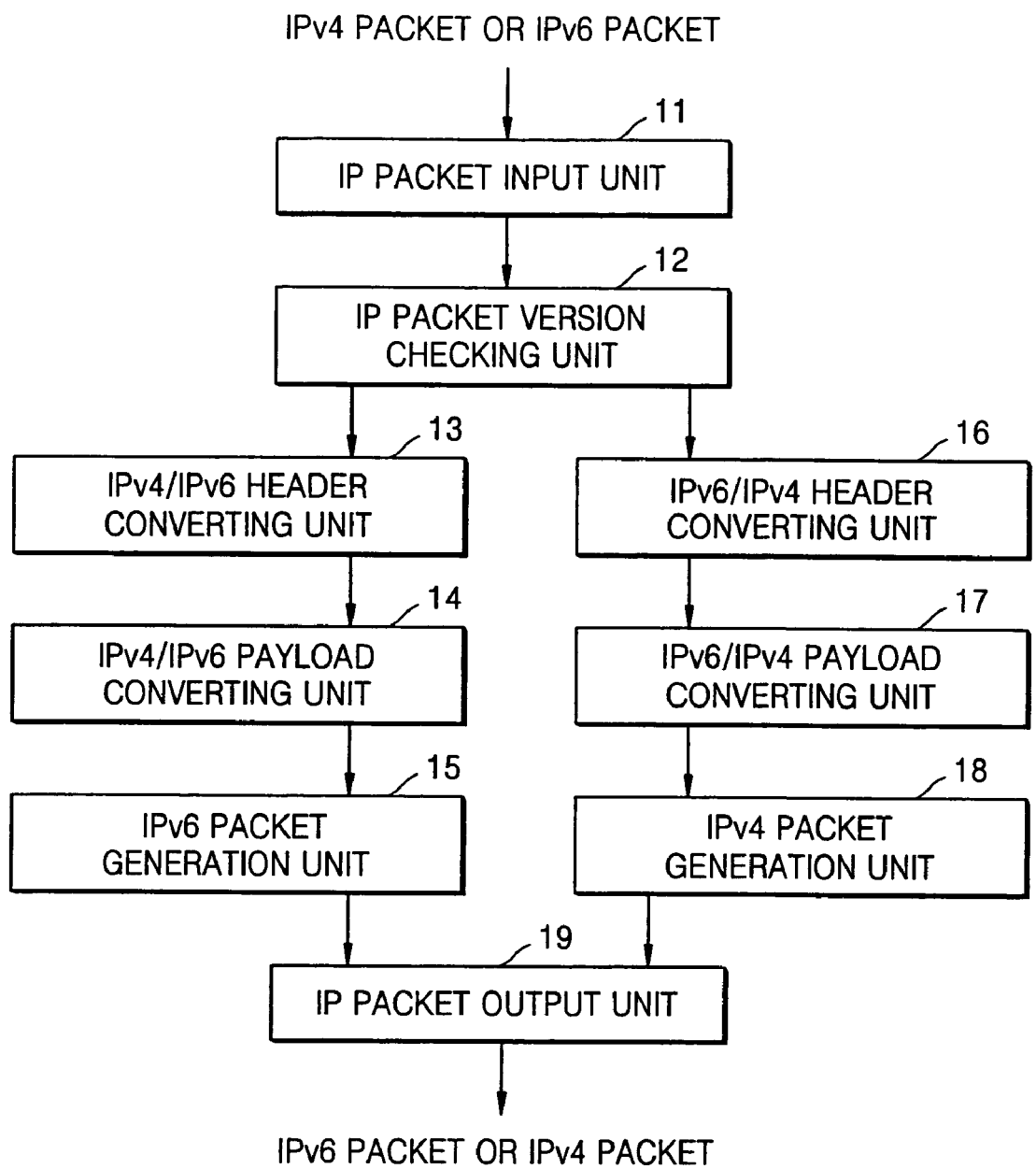
FIG. 1 is a block diagram illustrating an apparatus converting an IP packet version, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating an IP packet version converting apparatus, according to an embodiment of the present invention. Referring to FIG. 1, the apparatus includes an IP packet input unit 11, an IP packet version checking unit 12, an IPv4/IPv6 packet header converting unit 13, an IPv4/IPv6 payload converting unit 14, an IPv6 packet generation unit 15, an IPv6/IPv4 packet header converting unit 16, an IPv6/IPv4 packet payload converting unit 17, an IPv4 packet generation unit 18, and an IP packet output unit 19.

The IP packet input unit 11 receives an IP packet. The present invention is suitable for a transition from an IPv4 environment to an IPv6 environment, in which IPv4 and IPv6 are used. Therefore, the received IP packet could be an IPv4 packet or an IPv6 packet. The IP packet version checking unit 12 checks whether the received IP packet is an IPv4 packet or an IPv6 packet.

Figure 2:
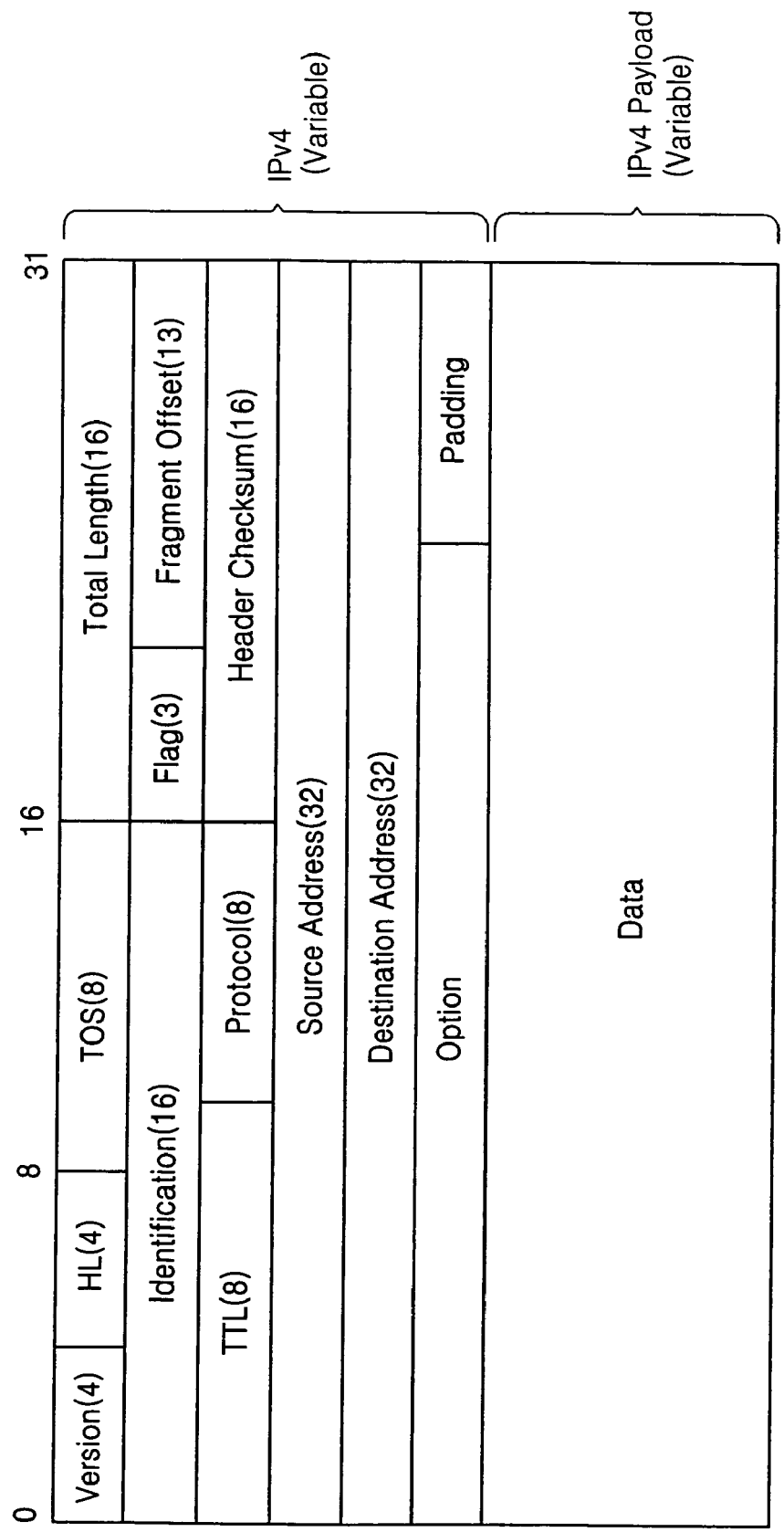
FIG. 2 is a diagram illustrating the format of an IPv4 packet.

FIG. 2 is a diagram illustrating the format of an IPv4 packet. Referring to FIG. 2, the IPv4 packet includes a header and a payload. Values corresponding to functions processed by the IPv4 are recorded in the header, and data to be transmitted is recorded in the payload. The header includes a version field, a header length field (HL), a type-of-service field (TOS), a total length field (Total Length), an identification field (Identification), a flag field (Flag), a fragment offset field (Fragment Offset), a time-to-live field (TTL), a protocol field (Protocol), a header checksum field (Header Checksum), a source address field (Source Address), a destination address field (Destination Address), an option field (Option), and a padding field (Padding).

Figure 3:
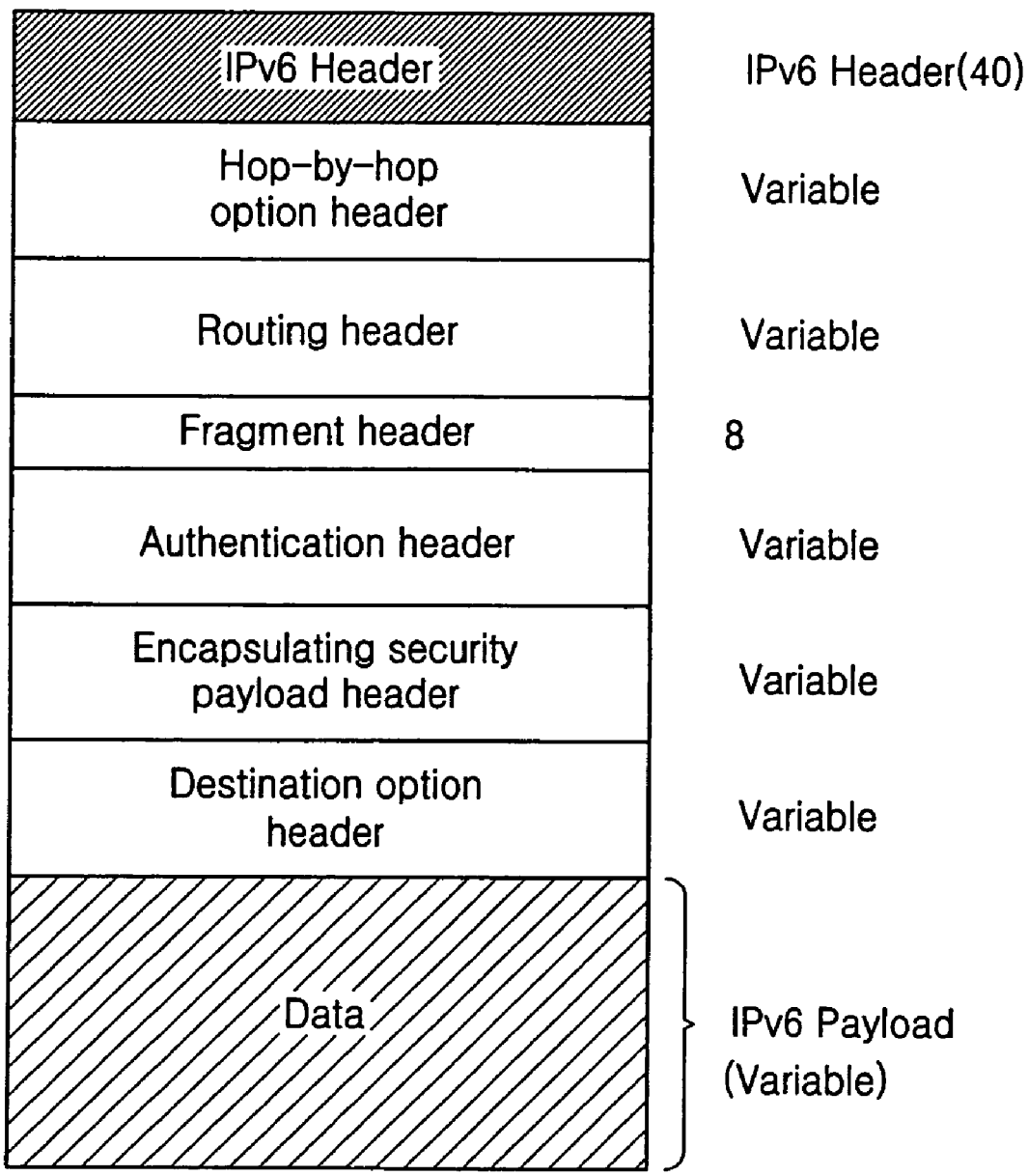
FIG. 3 is a diagram illustrating the format of an IPv6 packet.

FIG. 3 is a diagram illustrating the format of an IPv6 packet. Referring to FIG. 3, the IPv6 packet includes a basic header (hereinafter, referred to as an IPv6 packet header), an expansion header, and a payload. The IPv6 packet of FIG. 3 is different from the IPv4 packet of FIG. 2 in that the header of the IPv6 packet is divided into the basic header and the expansion header. Unlike the header of the IPv4 packet, which has a variable length, the basic header of the IPv6 packet has a fixed length of 40 bytes. However, the expansion header of the IPv6 packet has a variable length. As shown in FIG. 3, the basic header of the IPv6 packet may be followed by a plurality of expansion headers.

Figure 4:
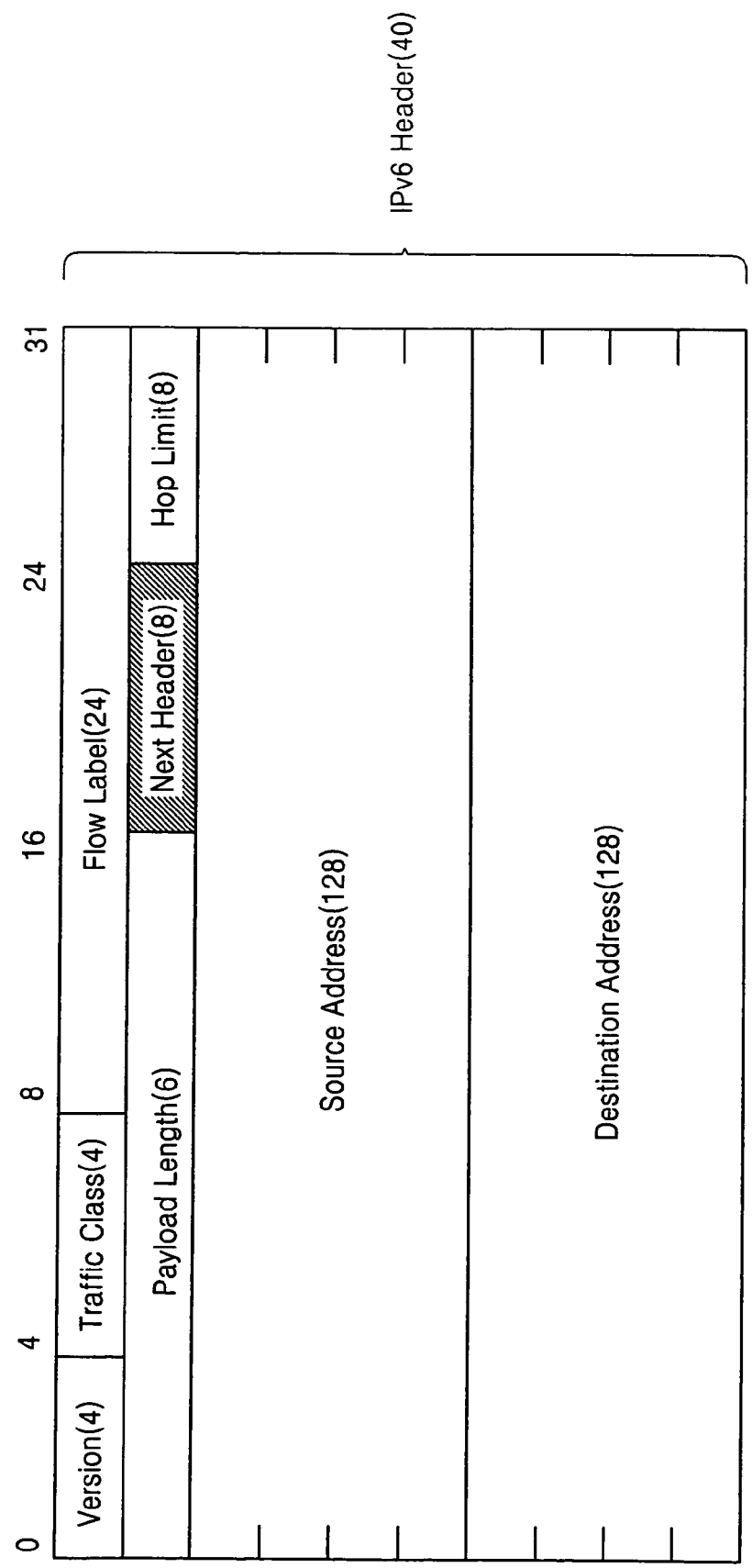
FIG. 4 is a diagram illustrating the format of a basic header of an IPv6 packet.

FIG. 4 is a diagram illustrating the format of a basic header of an IPv6 packet. Referring to FIG. 4, the basic header of the IPv6 packet includes a version field (Version), a traffic class field (Traffic Class), a flow label field (Flow Label), a payload length field (Payload Length), a next header field (Next Header), a hop limit field (Hop Limit), a source address field (Source Address), and a destination address field (Destination Address).

As shown in FIGS. 2 and 4, the first four bits of an IP packet account for a version field of the IP packet regardless of whether the IP packet is an IPv4 packet or an IPv6 packet. Therefore, the IP packet version checking unit 12 checks the version of the received IP packet by checking the version field of the received IP packet.

If the received IP packet is an IPv4 packet, the IPv4/IPv6 packet header converting unit 13 checks fields of a header of the received IP packet, like those of the header of the IPv4 packet of FIG. 2. The IPv4/IPv6 packet header converting unit 13 converts a first IPv4 packet field, in which a value corresponding to a basic function of the received IP packet, i.e., an IPv4 packet, is recorded, into a corresponding IPv6 packet field. Here, the basic function indicates a function that is compatible between different versions of IP packets, i.e., between an IPv4 packet and an IPv6 packet, when the different versions of IP packets are converted using a stateless IP/ICMP transistor (SIIT) defined in the Request for Comments (RFC) 2765.

More specifically, 6 is recorded in a version field of an IPv6 packet header, a type-of-service (TOS) value of an IPv4 packet header is recorded in a traffic class field of the IPv6 header, 0 is recorded in a total length field of the IPv4 packet header, a result of subtracting the length of the IPv4 packet header from a total length of the IPv4 packet is recorded in a payload length field of the IPv6 packet, a value of a protocol field of the IPv4 packet header is recorded in a next header field of the IPv6 packet header, and a time-to-live (TTL) value of the IPv4 packet header is recorded in a hop limit field of the IPv6 packet header. A value of a source address field of the IPv4 packet header is recorded in a $32^{nd}$ lower bit of a source address field of the IPv6 packet header, an IPv4-mapped prefix :ffff:0:0/96 is recorded in a $96^{th}$ upper bit of the source address field of the IPv6 packet header. A value of a destination address field of the IPv4 packet header is recorded in a $32^{nd}$ lower bit of a destination address field of the IPv6 packet header, and the IPv4-mapped prefix ::ffff:0:0/96 is recorded in a $96^{th}$ upper bit of the destination address field of the IPv6 packet header.

If there is a need to further attach a fragment header, which is one type of expansion header for an IPv4 packet, to the IPv6 packet header, in other words, if a 'don't fragment (DF)' bit is set in the IPv4 packet header or the IPv4 packet itself is a fragment, the IPv6 packet header is set as follows. A value is obtained by subtracting the sizes of the IPv4 packet header and the option and padding fields of the IPv4 packet header from a value of a total length field of the IPv4 packet and then adding the length of the fragment header, i.e., 8, to the subtraction result is recorded in a payload length field of the IPv6 packet header. A value representing the fragment header, i.e., 44, is recorded in a next header field of the IPv6 packet header. A value of a protocol field of the IPv4 packet header is recorded in a next header field of the IPv6 fragment header. A value of a fragment offset field of the IPv4 packet header is recorded in a fragment offset field of the IPv6 fragment header. A value of a more fragment (MF) bit of the IPv4 packet header is recorded in an M flag field of the IPv6 fragment header. A value of an identification field of the IPv4 packet header is recorded in a $16^{th}$ lower bit of an identification field of the IPv6 fragment header, and 0 is recorded in a $16^{th}$ upper bit of the identification field of the IPv6 fragment header. Fields of the IPv4 packet header that have not yet been mentioned above were ignored in the prior art but are utilized in the present invention. Descriptions thereof will be given in the following paragraphs.

If a value, indicating that a first expansion function is attached to the IPv4 packet, is recorded in one of the fields of the IPv4 packet header that has been checked by the IPv4/IPv6 packet header converting unit 13, i.e., a second field, the IPv4/IPv6 packet header converting unit 13 recognizes a third field in which a value regarding the first expansion function is recorded among the fields of the IPv4 packet header. Here, an expansion function indicates a function that is not compatible between different versions of IP packets, i.e., between an IPv4 packet and an IPv6 packet, when converting the IPv4 packet into the IPv6 packet or vice versa using SIIT, e.g., a security function defined in RFC 3514. The value indicating that the first expansion function is attached to the IPv4 packet may be recorded in one of the fields of the IPv4 packet header, such as the header length field or the header checksum field. If the value indicating that the first expansion function is attached to the IPv4 packet is recorded in the second field of the IPv4 packet, the IPv4/IPv6 packet header converting unit 13 recognizes the function based on the corresponding value indicating that the first expansion function is attached to the IPv4 packet and then searches for and recognizes the third field in which the value representing the first expansion function is recorded. More than one expansion function may be attached to an IPv4 packet. Thus, the IPv4/IPv6 packet header converting unit 13 is supposed to have a table in which a value, indicating that each expansion function is attached to the IPv4 packet is recorded, and a field, in which a value representing each expansion function is recorded, are mapped.

The IPv4/IPv6 packet header converting unit 13 converts the third field into an IPv6 packet field and then generates an IPv6 packet header including an IPv6 packet field corresponding to the first field and the IPv6 packet field corresponding to the third field. Expansion functions of an IPv4 packet, like basic functions of the IPv4 packet, are converted into functions that are compatible with an IPv6 packet. Therefore, after all the functions of the IPv4 packet, including the basic functions and the expansion functions, are converted into functions compatible with an IPv6 packet, an IPv6 packet header including the IPv6 packet fields that correspond to the fields of the received IP packet, i.e., the IPv4 packet, is generated.

If a value indicating the length of the payload of the IPv4 packet is recorded in one of the fields of the IPv4 packet that has been checked by the IPv4/IPv6 packet header converting unit 13, i.e., a fourth field, the IPv4/IPv6 payload converting unit 14 recognizes the payload of the IPv4 packet and generates an IPv6 payload including data recorded in the recognized payload of the IPv4 packet. In other words, the IPv4/IPv6 payload converting unit 14 recognizes the payload of the IPv4 packet by referring to the values of the header length field and the total length field of the IPv4 packet header.

If the received IP packet is an IPv6 packet, the IPv6/IPv4 packet header converting unit 16 checks fields of the header of the received IP packet, i.e., the IPv6 packet, like those illustrated in FIG. 4. If a value concerning a basic function of the IPv6 is recorded in one of the fields of the IPv6 packet, i.e., a fifth field, the IPv6/IPv4 packet header converting unit 16 converts the fifth field into an IPv4 packet field.

Functions of the IPv6 packet that can be made compatible with an IPv4 packet by using the SIIT are as follows. '4' is recorded in a version field of an IPv4 packet header. '5' is recorded in a header length field of the IPv4 packet header. A value of a traffic class field of the IPv6 packet header is recorded in a type-of-service (TOS) field of the IPv4 packet header. A value obtained by adding a value of a total length field of the IPv6 packet header to the size of the IPv4 packet header is recorded in a total length field of the IPv4 packet header. '0' is recorded in an identification field of the IPv4 packet header. '0' is recorded in an MF bit of a flag field of the IPv4 packet header. '1' is recorded in a DF field of the flag field of the IPv4 packet header. '0' is recorded in a fragment offset field of the IPv4 packet header. A value of a hop limit field of the IPv6 packet header is recorded in a time-to-live (TTL) field of the IPv4 packet header. A value of a next header field of the IPv6 packet header is recorded in a protocol field of the IPv4 packet header. A value calculated after the generation of the IPv4 packet header is recorded in a header checksum field of the IPv4 packet header. A value of a $32^{nd}$ lower bit of a source address field of the IPv6 packet header is recorded in a source address field of the IPv4 packet header. A value of a $32^{nd}$ lower bit of a destination address field of the IPv6 packet header is recorded in a destination address field of the IPv4 packet header. A value of a $32^{nd}$ lower bit of the destination address field of the IPv6 packet header is recorded in the destination address field of the IPv4 packet header.

If a fragment header is attached to the received IP packet, i.e., the IPv6 packet, the IPv4 packet header is set as follows. A value is obtained by subtracting the length of the fragment header, i.e., 8, from a value of the payload length field of the IPv6 packet and then adding the sizes of the IPv4 packet header and option and padding fields of the IPv4 packet header to the subtraction result and is then recorded in a total length field of the IPv4 packet header. A value representing the fragment header, i.e., 44, is recorded in a next header field of the IPv6 packet header. A value of an M flag field of the fragment header is recorded in the MF bit of the flag field of the IPv4 packet header. '0' is recorded in a DF bit of the flag field of the IPv4 packet header. A value of a fragment offset field of the fragment header is recorded in the fragment offset field of the IPv4 packet header. A value of the next header field of the fragment header is recorded in a protocol field of the IPv4 packet header. Fields of the IPv4 packet header that have not yet been mentioned above were ignored in the prior art but are utilized in the present invention. Descriptions thereof will be given in the following paragraphs.

If a value indicating that a second expansion function is attached to the received IP packet, i.e., the IPv6 packet, is recorded in a sixth field of the IPv6 packet, which is one of the fields that has already been checked, the IPv6/IPv4 packet header converting unit 16 searches for and recognizes a seventh field, in which a value regarding the second expansion function is recorded. The value indicating that the second expansion function is attached to the IPv6 packet may be recorded in any field of the IPv6 packet, such as a field of an expansion header. If the value indicating that the second expansion function is attached to the IPv6 packet is recorded in the sixth field of the IPv6 packet, the IPv6/IPv4 packet header converting unit 16 recognizes based on the corresponding value that the second expansion function is attached to the IPv6 packet and then searches for and recognizes the seventh field in which the value representing the first expansion function is recorded. More than one expansion function may be attached to an IPv6 packet. Thus, the IPv6/IPv4 packet header converting unit 16 should have a table in which a value, indicating that each expansion function attached to the IPv6 packet is recorded, and a field, in which a value representing each expansion function is recorded, are mapped.

The IPv6/IPv4 packet header converting unit 16 converts the seventh field into an IPv4 packet field and then generates an IPv4 packet header including an IPv4 packet field corresponding to the fifth field and the IPv4 packet field corresponding to the seventh field. Expansion functions of the IPv6 packet, for example, basic functions of the IPv6 packet, are converted into functions that are compatible with an IPv4 packet. Therefore, after all the functions of the IPv6 packet, including the basic functions and the expansion functions, are converted into functions compatible with an IPv4 packet, an IPv4 packet header including the IPv4 packet fields that correspond to the fields of the received IP packet, i.e., the IPv6 packet, is generated.

If a value indicating the length of a payload of the received IP packet, i.e., the IPv6 packet, is recorded in one of the fields of the IPv6 packet, i.e., an eighth field, the IPv6/IPv4 packet payload converting unit 17 recognizes the payload of the IPv6 packet and generates an IPv4 packet payload including data recorded in the payload of the IPv6 packet. In other words, the IPv6/IPv4 packet payload converting unit 17 recognizes the payload of the IPv6 packet by referring to the length of the IPv6 packet header, which is fixed to 40, and a value recorded in the payload field length of the IPv6 packet header.

The IPv6 packet generation unit 15 generates an IPv6 packet including the IPv6 packet header generated by the IPv4/IPv6 packet header converting unit 13 and the payload generated by the IPv4/IPv6 payload converting unit 14. The IPv4 packet generation unit 18 generates an IPv4 packet including the IPv4 packet header generated by the IPv6/IPv4 packet header converting unit 16 and the payload generated by the IPv6/IPv4 packet payload converting unit 17. The IP packet output unit 19 outputs the IPv6 packet generated by the IPv6 packet generation unit 15 or the IPv4 packet generated by the IPv4 packet generation unit 18.

FIG. 5 is a block diagram illustrating an IPv4/IPv6 packet header converting apparatus, according to an embodiment of the present invention. Referring to FIG. 5, the IPv4/IPv6 packet header converting apparatus includes an IPv4 packet header checking unit 51, an IPv4/IPv6 basic function converting unit 52, an IPv4 expansion function recognition unit 53, an IPv4/IPv6 expansion function converting unit 54, and an IPv6 packet header generation unit 55. The IPv4/IPv6 packet header converting apparatus of FIG. 5 corresponds to the IPv4/IPv6 packet header converting unit 13 but is an independent device rather than an element of a certain device. In addition, the IPv4/IPv6 packet header converting apparatus can be used for a device other than the IP packet version converting apparatus of FIG. 1.

The IPv4 packet header checking unit 51 checks fields of a header of an IPv4 packet. If a value regarding a basic function of the IPv4 packet is recorded in a predetermined field of the IPv4 packet header, the IPv4/IPv6 basic function converting unit 52 converts the predetermined field into an IPv6 packet field. If a value indicating that an expansion function is attached to the IPv4 packet is recorded in a predetermined field of the IPv4 packet, the IPv4 expansion function recognition unit 53 recognizes another predetermined field in which a value regarding the expansion function is recorded. The IPv4/IPv6 expansion function converting unit 54 converts the predetermined field in which the value regarding the expansion function is recorded into an IPv6 packet field. The IPv6 packet header generation unit 55 generates an IPv6 packet header including the IPv6 packet field generated by the IPv4/IPv6 basic function converting unit 52 and the IPv6 packet field generated by the IPv4/IPv6 expansion function converting unit 54.

The IPv4 expansion function recognition unit 53 can recognize the expansion function attached to the IPv4 packet in two different manners. In the first manner, the IPv4 expansion function recognition unit 53 recognizes the expansion function by referring to an option field of a header of the IPv4 packet. Since the option field can be freely defined, it is possible to define the expansion function in the option field. The IPv4 expansion function recognition unit 53 determines, based on an expansion function length field of the IPv4 packet header, whether the value regarding the expansion function is recorded in the option field. In other words, if a value recorded in the expansion function length field of the IPv4 packet header is larger than 20, which corresponds to the size of an IPv4 packet header without an option field, the IPv4 expansion function recognition unit 53 determines that the IPv4 packet header includes an option field in which the value regarding the expansion function is recorded and converts the IPv4 packet into an IPv6 packet in consideration of the option field of the IPv4 packet header. In short, if the value indicating that a predetermined expansion function is attached to the IPv4 packet is recorded in one of the fields of the IPv4 packet that has been checked by the IPv4 packet header checking unit 51, the IPv4 expansion function recognition unit 53 recognizes a predetermined field in which the value regarding the predetermined expansion function is recorded.

The expansion function attached to the IPv4 packet, such as a security function that is defined in RFC 3574, can be recognized by the IPv4 expansion function recognition unit 53 and then included in an IPv6 packet in the following manner. A value regarding the security function is recorded in an upper bit of a fragment offset field of the IPv4 packet header. The security function was ignored in a conventional IP packet version converting process using an SIIT. However, in the present invention, the security function is recognizable by determining, based on a value of a first bit of a flag field of the IPv4 packet header, whether the value regarding the security function is recorded in the upper bit of the fragment offset field of the IPv4 packet header. More specifically, the IPv4 expansion function recognition unit 53 checks the value of the first bit of the flag field of the IPv4 packet header. If the first bit of the flag field of the IPv4 packet header has a value of 1, the IPv4 expansion function recognition unit 53 determines that the value regarding the security function is recorded in the upper bit of the fragment offset field. If the value regarding the security function is not recorded in the upper bit of the fragment offset field, the value of the first bit of the flag field of the IPv4 packet header has a value of 0. In short, if the value indicating that the security function is attached to the IPv4 packet is recorded in the first bit of the flag field of the IPv4 packet, the IPv4 expansion function recognition unit 53 recognizes the upper bit of the fragment offset field of the IPv4 packet header, in which the value regarding the security function is recorded.

The IPv4/IPv6 expansion function converting unit 54 converts the upper bit of the fragment offset field of the IPv4 packet, recognized by the IPv4 expansion function recognition unit 53, into an upper bit of a flow label field of an IPv6 packet header. Here, the upper bit of the flow label field of the IPv6 packet header is not yet in use, and thus, the value of the upper bit of the fragment offset field of the IPv4 packet header is recorded in the upper bit of the flow label field of the IPv6 packet header. Alternatively, the value of the upper bit of the fragment offset field of the IPv4 packet header can be recorded in any field of a basic header or an expansion header of an IPv6 packet, which is not in use.

FIG. 6 is a block diagram illustrating an IPv6/IPv4 packet header converting apparatus, according to an embodiment of the present invention. Referring to FIG. 6, the IPv6/IPv4 packet header converting apparatus includes an IPv6 packet header checking unit 61, an IPv6/IPv4 basic function converting unit 62, an IPv6 packet expansion function recognition unit 63, an IPv6/IPv4 expansion function converting unit 64, and an IPv4 packet header generation unit 65. The IPv6/IPv4 packet header converting apparatus of FIG. 6 corresponds to the IPv6/IPv4 packet header converting unit 16 but is an independent device rather than an element of a certain device. In addition, the IPv6/IPv4 packet header converting apparatus can be used for a device other than the IP packet version converting apparatus of FIG. 1.

The IPv6 packet header checking unit 61 checks fields of a header of an IPv6 packet. If a value regarding a basic function of the IPv6 packet is recorded in a predetermined field of the IPv6 packet header, the IPv6/IPv4 basic function converting unit 62 converts the predetermined field into an IPv4 packet field. If a value indicating that an expansion function is attached to the IPv6 packet is recorded in a predetermined field of the IPv6 packet, the IPv6 expansion function recognition unit 63 recognizes another predetermined field in which a value regarding the expansion function is recorded. The IPv6/IPv4 expansion function converting unit 64 converts the predetermined field in which the value regarding the expansion function is recorded into an IPv4 packet field. The IPv4 packet header generation unit 65 generates an IPv4 packet header including the IPv4 packet field generated by the IPv6/IPv4 basic function converting unit 62 and the IPv4 packet field generated by the IPv6/IPv4 expansion function converting unit 64.

The IPv6 expansion function recognition unit 63 can recognize the expansion function attached to the IPv6 packet in various manners, which will be described in the following paragraph.

First, the IPv6 expansion function recognition unit 63 can recognize the expansion function by referring to an expansion header. Since the expansion header can be freely defined, it is possible to define the expansion function attached to the IPv6 packet in the expansion header. The IPv6 expansion function recognition unit 63 determines, based on a next header field of the IPv6 packet header, whether a value recorded in the next header field of the IPv6 packet header represents the expansion header in which the value regarding the expansion function is recorded. In other words, if the value recorded in the next header field of the IPv6 packet header represents the expansion header in which the value regarding the expansion function is recorded, the IPv6 expansion function recognition unit 63 recognizes a predetermined field of the expansion header, in which the value regarding the expansion function is recorded.

Figure 7:
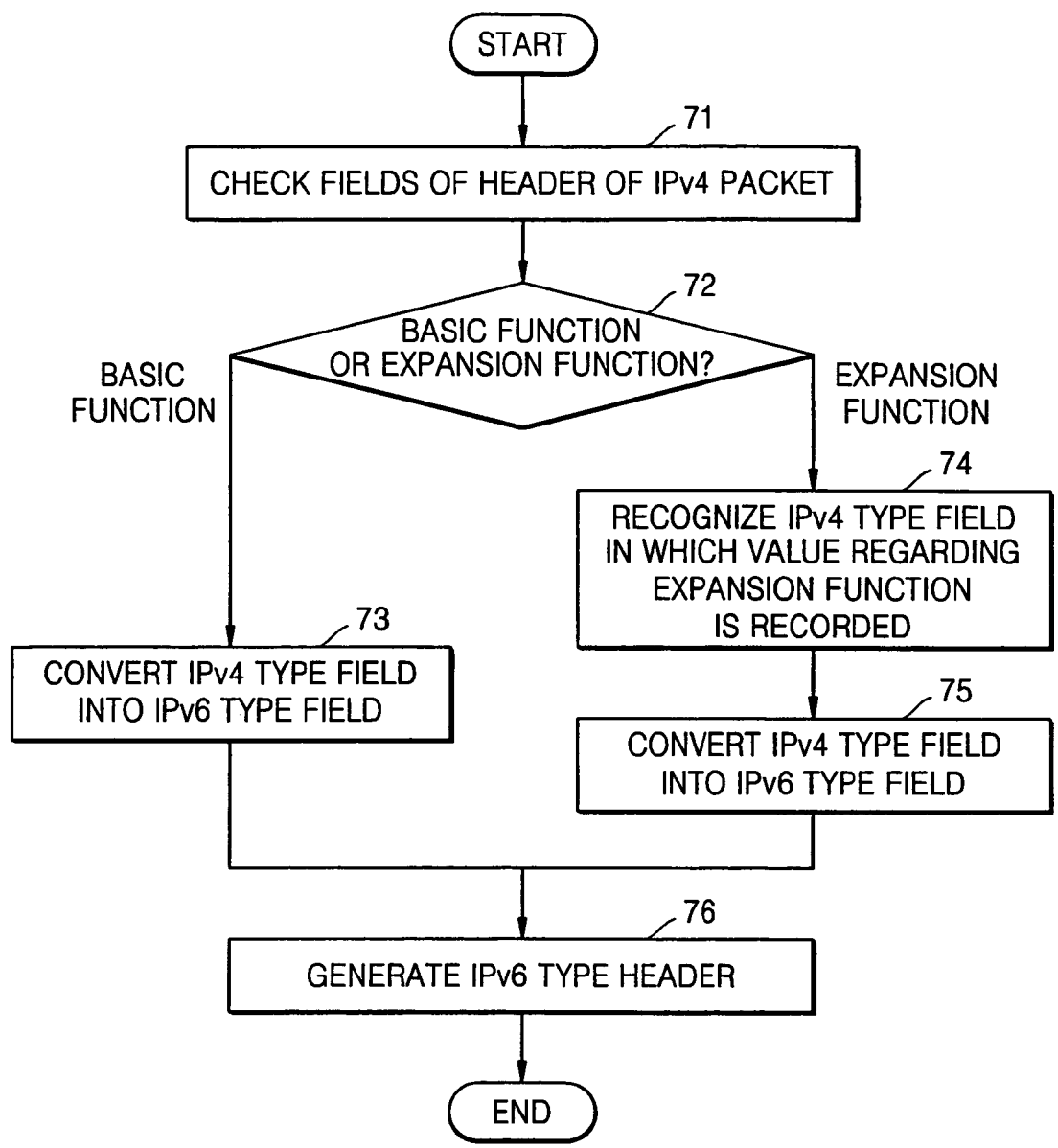
FIG. 7 is a flowchart illustrating an IPv4/IPv6 packet header converting method, according to an embodiment of the present invention.

FIG. 7 is a flowchart illustrating an IPv4/IPv6 packet header converting method, according to an embodiment of the present invention. Referring to FIG. 7, fields of a header of an IPv4 packet are checked in operation 71. If a value regarding a basic function of the IPv4 packet is recorded in a predetermined field of the IPv4 packet header in operation 72, the predetermined field is converted into an IPv6 packet field in operation 73.

If a value indicating that a predetermined expansion function is attached to the IPv4 packet is recorded in a predetermined field of the IPv4 packet header in operation 72, a field in which a value regarding the predetermined expansion function is recognized in operation 74. In operation 72, the value indicating that the predetermined expansion function is attached to the IPv4 packet could be recorded in a header length field of the IPv4 packet header.

In operation 75, the field in which the value regarding the predetermined expansion function is recorded is converted into an IPv6 packet field. For example, if a value indicating that a security function is attached to the IPv4 packet is recorded in a first bit of a flag field of the IPv4 packet header in operation 72, an upper bit of a fragment offset field of the IPv4 packet header, in which a value regarding the security function is recorded, is recognized in operation 74. Thereafter, in operation 75, the upper bit of the fragment offset field of the IPv4 packet header is converted into an upper bit of a flow label field of an IPv6 packet header. In operation 76, an IPv6 packet header including the IPv6 packet fields obtained in operations 73 and 74 is generated.

Figure 8:
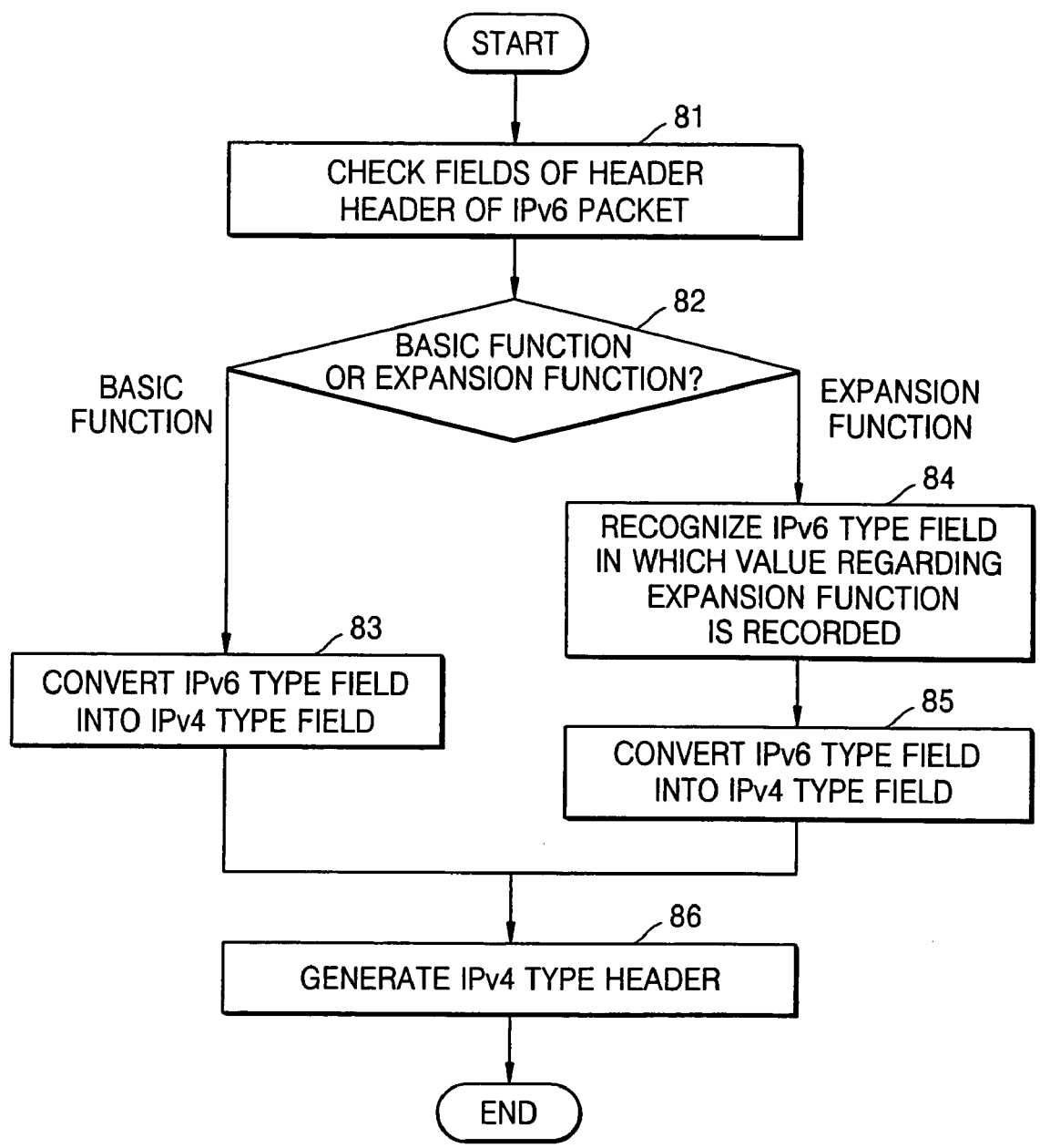
FIG. 8 is a flowchart illustrating an IPv4/IPv6 packet header converting method, according to another embodiment of the present invention.

FIG. 8 is an IPv6/IPv4 packet header converting method, according to an embodiment of the present invention. Referring to FIG. 8, fields of a header of an IPv6 packet are checked in operation 81. If a value regarding a basic function of the IPv6 packet is found to be recorded in a predetermined field of the IPv6 packet header in operation 82, the predetermined field is converted into an IPv4 packet field in operation 83.

If a value indicating that a predetermined expansion function is attached to the IPv6 packet is found to be recorded in a predetermined field of the IPv6 packet header in operation 82, a field in which a value regarding the predetermined expansion function is recognized in operation 84. For example, if a value representing an expansion header, in which the value regarding the predetermined expansion function is recorded, is recorded in a next header field of the IPv6 packet header in operation 82, a field of the expansion header, in which the value regarding the predetermined expansion function is recorded, is recognized in operation 84. Thereafter, the field of the expansion header, in which the value regarding the predetermined expansion function is recorded, is converted into an IPv4 packet field in operation 85. In operation 86, an IPv4 packet header including the IPv6 packet fields obtained in operations 83 and 85 is generated.

FIG. 9 is a flowchart illustrating an IP packet version converting method, according to an embodiment of the present invention. Referring to FIG. 9, an IP packet is received in operation 91. A version of the received IP packet is checked in operation 92. If the received IP packet is an IPv4 packet in operation 93, fields of a header of the received IP packet, i.e., the IPv4 packet, are checked. If a value regarding a basic function of the IPv4 packet is recorded in one of the fields of the IPv4 packet header that have already been checked, i.e., a first field, the first field is converted into an IPv6 packet field. If a value indicating that a first expansion function is attached to the IPv4 packet is recorded in a second field of the IPv4 packet, a third field, in which a value regarding the first expansion function is recorded, is recognized and then converted into an IPv6 packet field, and an IPv6 packet header including the IPv6 packet fields corresponding to the first and third fields is generated in operation 94. If a value indicating the length of a payload of the IPv4 packet is recorded in a fourth field of the IPv4 packet, the payload of the IPv4 packet is recognized, and then an IPv6 payload including data recorded in the recognized payload is generated in operation 95. Thereafter, an IPv6 packet including the IPv6 packet header and the IPv6 payload is generated in operation 96.

If the received IP packet is an IPv6 packet in operation 93, fields of the header of the received packet, i.e., the IPv6 packet, are checked. If a value regarding a basic function of the IPv6 packet is recorded in a fifth field of the IPv6 packet, the fifth field is converted into an IPv4 packet field. If a value indicating that a second expansion function is attached to the IPv6 packet is recorded in a sixth field of the IPv6 packet, a seventh field, in which a value regarding the second expansion function is recorded, is recognized and then converted into an IPv4 packet field, and an IPv4 packet header including the IPv4 packet fields corresponding to the fifth and seventh fields is generated in operation 97. If a value indicating the length of a payload of the IPv6 packet is recorded in an eighth field of the IPv6 packet, the payload of the IPv6 packet is recognized, and an IPv4 packet payload including data recorded in the recognized payload is generated in operation 98. Thereafter, an IPv4 packet including the IPv4 packet header and the IPv4 packet payload is generated in operation 99. In operation 910, the IPv6 packet generated in operation 96 or the IPv4 packet generated in operation 99 is output.

The above-described embodiments of the present invention can be realized as a program which can be written on a computer-readable recording medium and can then be executed in a digital computer.

The computer-readable recording medium includes a magnetic storage medium, such as a ROM, a floppy disk, or a hard disk, an optical storage medium, such as a CD-ROM or a DVD, and a carrier wave, such as data transmission through the Internet.

According to the present invention, it is possible to have all of the functions of IPv4 and IPv6 packets completely compatible between the IPv4 and IPv6 packets when converting the IPv4 packet into the IPv6 packet or vice versa, regardless of whether the functions of the IPv4 and IPv6 packets are ones specified in RFC 2765. Therefore, in an environment where IPv4 and IPv6 coexist, it is possible to convert an IPv4 packet into an IPv6 packet or vice versa with all of the functions of the IPv4 packet or the IPv6 packet intact. Especially, an IPv4 security function, which is defined in RFC 3514, can be safely transferred from an IPv4 packet to an IPv6 packet when converting the IPv4 packet into the IPv6 packet so that the IPv6 packet can have a security function that the IPv4 packet had and thus can be protected from hacking attack.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An IP packet header converting method comprising:
   recognizing a value regarding an expansion function recorded in one of a plurality of fields of a header of an IP packet of a first type, the expansion function being incompatible between the IP packet of the first type and an IP packet of a second type;
   converting the one of the plurality of fields including the recognized value into a field compatible with the IP packet of the second type; and
   checking the plurality of fields of the header of the IP packet of the first type,
   wherein if the value indicating that the expansion function attached to the IP packet of the first type is recorded in another one of the plurality of fields of the header of the IP packet of the first type, the field in which the value regarding the expansion function is recorded is recognized by using the value indicating that the expansion function is attached to the IP packet of the first type.

2. The IP packet header converting method of claim 1, further comprising: converting another one of the plurality of fields of the header of the IP packet of the first type, in which a value regarding a basic function is recorded, into a field compatible with the IP packet of the second type, the basic function being compatible between the IP packets of the first and second types.

3. The IP packet header converting method of claim 2, further comprising:
   generating a header of an IP packet of the second type that includes the fields obtained in converting the field recognized in the header of the IP packet of the first type and the field compatible with the IP packet of the second type.

4. The IP packet header converting method of claim 1, wherein the IP packet of the first type is an IPv4 packet, the IP packet of the second type is an IPv6 packet, and the IP packets of the first and second types are convertible from one to the other using a Stateless Internet Protocol/Internet Control Message Protocol (IP/ICMP) Transistor (SIIT) defined in Request for Comments (RFC) 2765.

5. The IP packet header converting method of claim 4, wherein if the value indicating that the expansion function is attached to the IPv4 packet is recorded in a header length field of a header of the IPv4 packet, another field of the header of the IPv4 packet, in which the value regarding the expansion function is recorded, is recognized.

6. The IP packet header converting method of claim 4, wherein in recognizing one of the plurality of fields of the header of the IP packet of the first type, if a value indicating that a security function, which is a type of the expansion function, is attached to the IPv4 packet is recorded in a first bit of a flag field of the header of the IPv4 packet, an upper bit of a fragment offset field of the header of the IPv4 packet, in which a value regarding the security function is recorded, and converting the field recognized in the header of the IP packet of the first type, the upper bit of the fragment offset field of the header of the IPv4 packet is converted into an upper bit of a flow label field of a header of an IPv6 packet.

7. The IP packet header converting method of claim 1, wherein the IP packet of the first type is an IPv6 packet, the IP packet of the second type is an IPv4 packet, and the IP packets of the first and second types are convertible from one to the other using a stateless IP/ICMP transistor (SIIT) defined in Request for Comments (RFC) 2765.

8. The IP packet header converting method of claim 7, wherein if a value indicating an expansion header, in which the value regarding the expansion function is recorded, is recorded in a next header field of the header of the IPv6 packet, the next header field of the header of the IPv6 packet is recognized.

9. An IP packet version converting method comprising:
   recognizing a value regarding an expansion function recorded in one of a plurality of fields of a header of an P packet of a first type;
   converting the one of the plurality of fields of the header of the IP packet of the first type into a field of a header of an IP packet of a second type, the expansion function being incompatible between the IP packet of the first type and the IP packet of the second type; and
   generating a payload of an IP packet of the second type including data written in a payload of the IP packet of the first type,
   wherein if a value indicating that the expansion function attached to the IP packet of the first type is recorded in another one of the fields of the header of the IP packet of the first type, the field, in which the value regarding the expansion function is recorded, is recognized using the value indicating that the expansion function is attached to the IP packet of the first type, and the recognized field is converted into a field compatible with the IP packet of the second type, and a header of the IP packet of the second type including the field, into which the recognized field of the header of the IP packet of the first type is converted, is generated.

10. The IP packet version converting method of claim 9, wherein in the generation of the payload of the IP packet of the second type, if a value regarding the length of a payload of the IP packet of the first type is recorded in another one of the plurality of fields of the header of the IP packet of the first type, the payload of the IP packet of the first type is recognized using the value regarding the length of the payload of the IP packet of the first type, and a payload of an IP packet of the second type including data recorded in the recognized payload is generated.

11. The IP packet version converting method of claim 9, further comprising:

checking a version of a predetermined IP packet, wherein in the conversion of one of the plurality of fields of the header of the IP packet of the first type, a header of the predetermined IP packet, which is identified by an IP packet of the first type, is converted into a header compatible with an IP packet of the second type.

12. The IP packet version converting method of claim 9 further comprising:

generating an IP packet of the second type including the header generated in the conversion of one of the plurality of fields of the header of the IP packet of the first type and the payload generated in the generation of the payload of the IP packet of the second type.

13. The IP packet version converting method of claim 9, wherein the IP packet of the first type is an IPv4 packet, the IP packet of the second type is an IPv6 packet, and the IP packets of the first and second types are convertible from one to the other using a Stateless Internet Protocol/Internet Control Message Protocol (IP/ICMP) Transistor (SIIT) defined in Request for Comments (RFC) 2765.

14. The IP packet version converting method of claim 9, wherein the IP packet of the first type is an IPv6 packet, the IP packet of the second type is an IPv4 packet, and the P packets of the first and second types are convertible from one to the other using a stateless IP/ICMP transistor (SIIT) defined in Request for Comments (RFC) 2765.

15. A computer-readable storage medium, on which a program enabling an IP packet header converting method is stored, the IP packet header converting method comprising: recognizing a value regarding an expansion function in one of a plurality of fields of a header of an IP packet of a first type, the expansion function being incompatible between the IP packet of the first type and an IP packet of a second type; converting the one of the plurality of fields including the recognized value into a field compatible with the IP packet of the second type; and checking the plurality of fields of the header of the IP packet of the first type, wherein if the value indicating that the expansion function attached to the IP packet of the first type is recorded in another one of the plurality of fields of the header of the IP packet of the first type, the field in which the value regarding the expansion function is recorded is recognized by using the value indicating that the expansion function is attached to the IP packet of the first type.

16. A computer-readable storage medium, on which a program enabling an IP packet version converting method is stored, the IP packet version converting method comprising: recognizing a value regarding an expansion function recorded in one of a plurality of fields of a header of an IP packet of a first type; converting the one of the plurality of fields of the header of the IP packet of the first type into a field of a header of an IP packet of a second type, the expansion function being incompatible between the IP packets of the first and second types; and generating a payload of an IP packet of the second type including data written in a payload of the IP packet of the first type, wherein if a value indicating that the expansion function attached to the IP packet of the first type is recorded in another one of the fields of the header of the IP packet of the first type, the field, in which the value regarding the expansion function is recorded, is recognized using the value indicating that the expansion function is attached to the IP packet of the first type, and the recognized field is converted into a field compatible with the IP packet of the second type, and a header of the IP packet of the second type including the field, into which the recognized field of the header of the IP packet of the first type is converted, is generated.

\* \* \* \* \*

UNITED STATES PATENT AND TRADEMARK OFFICE
CERTIFICATE OF CORRECTION

PATENT NO.         : 7,474,675 B2
APPLICATION NO. : 10/936666
DATED              : January 6, 2009
INVENTOR(S)       : Soo-hong Park et al.

It is certified that error appears in the above-identified patent and that said Letters Patent is hereby corrected as shown below:

Column 11, Line 58, change
"The IP packet header converting method of claim 1, further comprising: converting another one of the plurality of fields of the header of the IP packet of the first type, in which a value regarding a basic function is recorded, into a field compatible with the IP packet of the second type, the basic function being compatible between the IP packets of the first and second types." to
--The IP packet header converting method of claim 1, further comprising: converting another one of the plurality of fields of the header of the IP packet of the first type, in which a value regarding a basic function is recorded, into a field compatible with the IP packet of the second type, the basic function being compatible between the IP packets of the first and second types.--.

Column 12, Line 44, change "P" to --IP--.

Column 13, Line 32, change "P" to --IP--.

Signed and Sealed this

Twenty-fourth Day of March, 2009

JOHN DOLL
*Acting Director of the United States Patent and Trademark Office*